United States Patent Office.

C. B. SKIFF, OF JERSEY CITY, NEW JERSEY.

Letters Patent No. 91,680, dated June 22, 1869.

---

IMPROVED COMPOUND FOR EXTRACTING OILS, PAINT, GREASE, AND THE LIKE, FROM CLOTHES.

---

The Schedule referred to in these Letters Patent and making part of the same.

---

*To all whom it may concern:*

Be it known that I, C. B. SKIFF, of Jersey City, in the county of Hudson, and State of New Jersey, have invented a new and improved Chemical Compound for Extracting Paints, Oils, Grease, and Tar from Cloths; and I do hereby declare that the following is a full, clear, and exact description thereof, which will enable others skilled in the art to make and use the same.

My invention has for its object to furnish an improved chemical compound, by means of which paint, oil, grease, and tar-spots may be easily, quickly, and thoroughly removed from clothing and other cloths, so as to leave no stain or spot upon the cloth; and It consists in the composition, prepared of the ingredients, in the proportions and manner hereinafter set forth and described.

In preparing this composition, I take one pound of aqua ammonia, one ounce of opodeldoc liquor, one ounce of glycerine-oil, one ounce of pulverized borax, one ounce of pulverized sal-soda, one ounce of sulphuric ether, and two ounces of castile-soap, shaved fine, and put them into a kettle containing about fourteen quarts of soft water, and boil them until all the ingredients are dissolved, usually about twelve hours, or until the quantity is reduced to about a gallon.

The composition is then ready for use.

Having thus described my invention,

What I claim as new, and desire to secure by Letters Patent, is—

The chemical composition, formed of the ingredients, in the proportions and manner substantially as herein set forth and described.

The above specification of my invention signed by me, this 21st day of April, 1869.

C. B. SKIFF.

Witnesses:
 FRANK BLOCKLEY,
 JAMES T. GRAHAM.